(12) United States Patent
Nanda et al.

(10) Patent No.: US 7,290,053 B2
(45) Date of Patent: *Oct. 30, 2007

(54) SYSTEM AND METHOD FOR ENFORCING QUOTAS ON OBJECT CREATION IN A REPLICATED DIRECTORY SERVICE DATABASE

(75) Inventors: Arun K. Nanda, Sammamish, WA (US); Donald J. Hacherl, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 292 days.

This patent is subject to a terminal disclaimer.

(21) Appl. No.: 11/083,502

(22) Filed: Mar. 18, 2005

(65) Prior Publication Data

US 2005/0165833 A1    Jul. 28, 2005

Related U.S. Application Data

(63) Continuation of application No. 10/464,913, filed on Jun. 19, 2003.

(51) Int. Cl.
*G06F 15/173* (2006.01)
*G06F 12/00* (2006.01)

(52) U.S. Cl. .................. 709/225; 709/223; 709/224; 707/206

(58) Field of Classification Search ............... 709/225, 709/223, 224; 707/102, 103 R–103 Z, 200–206
See application file for complete search history.

(56) References Cited

U.S. PATENT DOCUMENTS

| 5,649,194 | A | 7/1997 | Miller et al. |
| 5,675,787 | A | 10/1997 | Miller et al. |
| 5,689,700 | A | 11/1997 | Miller et al. |
| 5,708,812 | A | 1/1998 | Van Dyke et al. |
| 5,787,442 | A | 7/1998 | Hacherl et al. |
| 5,893,107 | A | 4/1999 | Chan et al. |
| 6,081,898 | A | 6/2000 | Miller et al. |
| 6,256,634 | B1 * | 7/2001 | Moshaiov et al. .......... 707/100 |
| 6,360,230 | B1 | 3/2002 | Chan et al. |
| 6,438,549 | B1 | 8/2002 | Aldred et al. |
| 6,484,177 | B1 | 11/2002 | Van Huben et al. |
| 6,553,384 | B1 | 4/2003 | Frey et al. |
| 2003/0009484 | A1 * | 1/2003 | Hamanaka et al. ......... 707/200 |

* cited by examiner

*Primary Examiner*—Glenton B. Burgess
*Assistant Examiner*—Philip J. Chea
(74) *Attorney, Agent, or Firm*—Workman Nydegger

(57) ABSTRACT

A system and method for managing the creation of objects in a distributed directory service system assigns quotas to entities (such as users, computers, groups) to limit the number of objects each entity is allowed to create and own. For purposes of enforcing the quotas, tombstones generated for deleted objects are taken into account in the calculation of a weighted total number of objects owned by an entity, with each tombstone counted as a configurable fraction of a regular object. When an entity requests a directory operation that will increase the number of objects owned by that entity, the number of system objects owned by that entity is added to the number of tombstones multiplied by the fractional tombstone factor to generate the weighted total, which is compared to the quota of that entity to determine when the requested operation should be performed.

6 Claims, 6 Drawing Sheets

Quota Table 150

| Entity Name | SID | TombstoneCount | TotalCount |
|---|---|---|---|
| User1 | xxxx | 40 | 60 |
| Group 2 | xxxx | 100 | 160 |
| User 2 | xxxx | 20 | 10 |
| . . . | . . . | . . . | . . . |

SYSTEM AND METHOD FOR ENFORCING QUOTAS ON OBJECT CREATION IN A REPLICATED DIRECTORY SERVICE DATABASE

RELATED APPLICATION

This application is a continuation of the coassigned and copending U.S. patent application Ser. No. 10/464,913, filed on Jun. 19, 2003, and entitled "System and Method for Enforcing Quotas on Object Creation in a Replicated Directory Service Database." Priority is hereby claimed to this case under 35 U.S.C. § 120.

TECHNICAL FIELD

This invention relates generally to computer networks, and more particularly to the management of a replicated directory service for a computer network.

BACKGROUND OF THE INVENTION

A directory service for a computer network has system objects representing users, groups, computers, and various other things. Depending on the implementation of the directory service, the creation and deletion of the directory service objects may be done either only by authorized network administrators or computers or by regular users. Regardless of who is allowed to create objects, there is a security risk that an entity (a user, group, or computer) that has been delegated the authority to create objects may indiscriminately or intentionally create too many system objects that will hinder the operation of the directory service. For instance, a user that is allowed to create objects may turn renegade and launch a denial-of-service attack by creating a large number of objects to exhaust the resources of the directory service. To prevent such a risk, it has been proposed to impose an entity-based quota on the number of objects each user/computer may own in a given directory service database.

The use of quotas to control the creation of directory service objects, however, does not provide a complete solution. A network directory service is typically a distributed database system in which the creation and deletion of objects on one directory server (e.g., an Active Directory domain controller) are replicated to other directory servers in the distributed database. For replication purposes, when a directory server deletes an object, it sets up a "tombstone" object for the deleted object to keep track of the deletion while the deletion is replicated through the network to the other servers. Although tombstone objects are typically significantly smaller than regular directory service objects, they are not cost free. Thus, even if the directory service enforces object quotas, an entity can still create a problem by repeatedly creating and deleting objects to cause the generation of a large number of tombstones, while keeping the total system objects under its name within the quota assigned to it. Accordingly, there is a need to handle the creation of tombstones in connection with the use of object quotas in a directory service.

SUMMARY OF THE INVENTION

In view of the foregoing, the present invention provides a system and method for managing object quotas in a distributed directory service system that takes tombstones into account in the tracking and enforcement of object quotas assigned to network entities that are allowed to create directory service objects. In accordance with the invention, a tombstone is counted as a fraction of a normal system object for purposes of calculating the total number of objects owned by an entity (e.g., a user, computer, or group) for comparison with the assigned quota. When an entity requests a directory operation that will increase the number of objects owned by that entity, a weighted total number of objects owned by that entity is calculated as the sum of the number of regular system objects and the number of tombstones of that entity multiplied by a pre-selected fractional tombstone factor. The weighted total number is then compared to the quota assigned to that entity to determine whether the quota will be exceeded if the requested operation is performed.

BRIEF DESCRIPTION OF THE DRAWINGS

FIG. 6 is a schematic diagram showing a table used in an embodiment of the invention for keeping track of quota consumption by different entities.

DETAILED DESCRIPTION OF THE INVENTION

Figure 1:
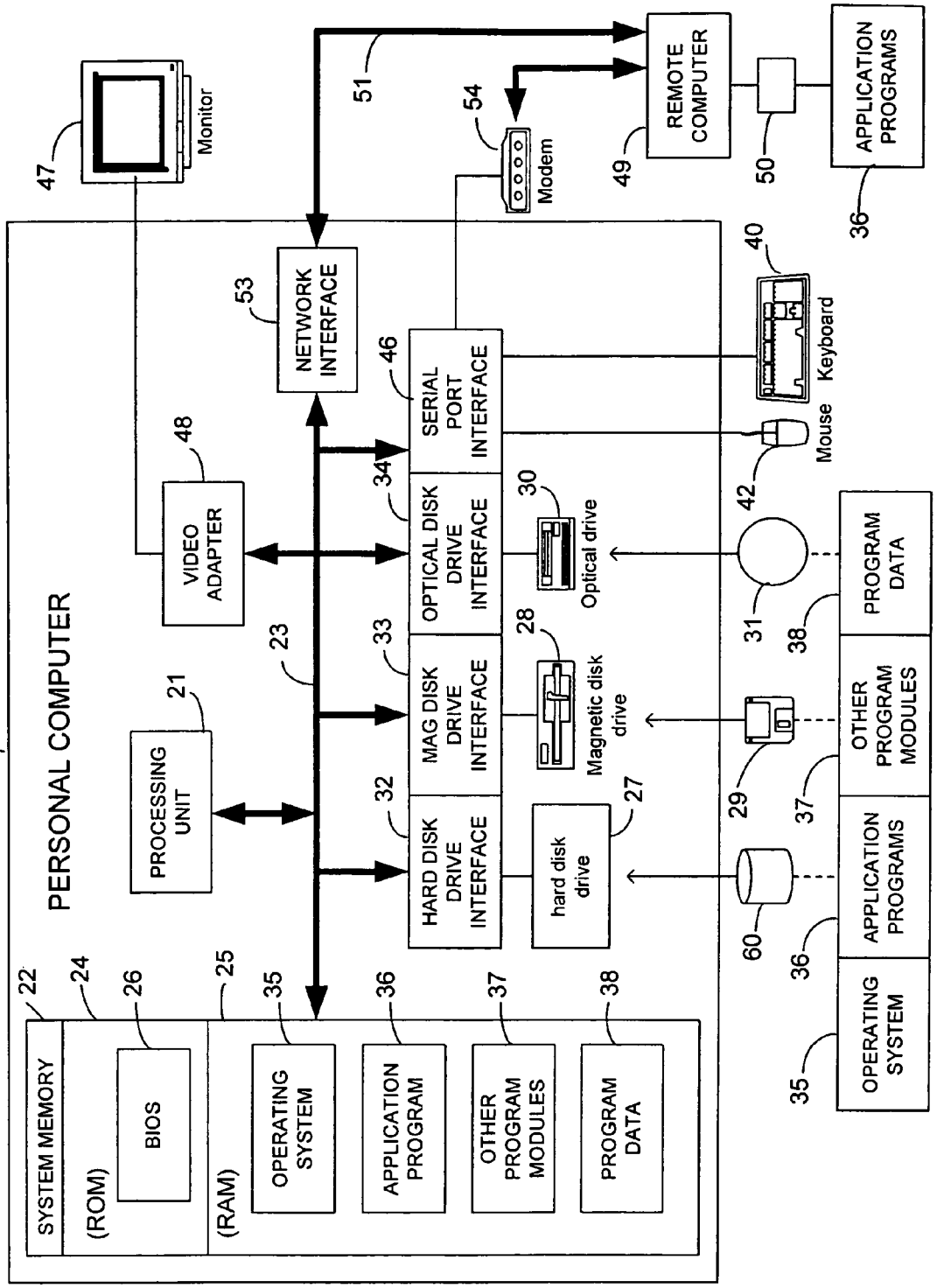
FIG. 1 is a block diagram generally illustrating an exemplary computer system on which the object quota management for a directory service of the present invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may be used in an exemplary system for implementing the invention, and the quota management architecture for a directory service system of the invention will be described in greater detail with reference to FIGS. 2-6. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
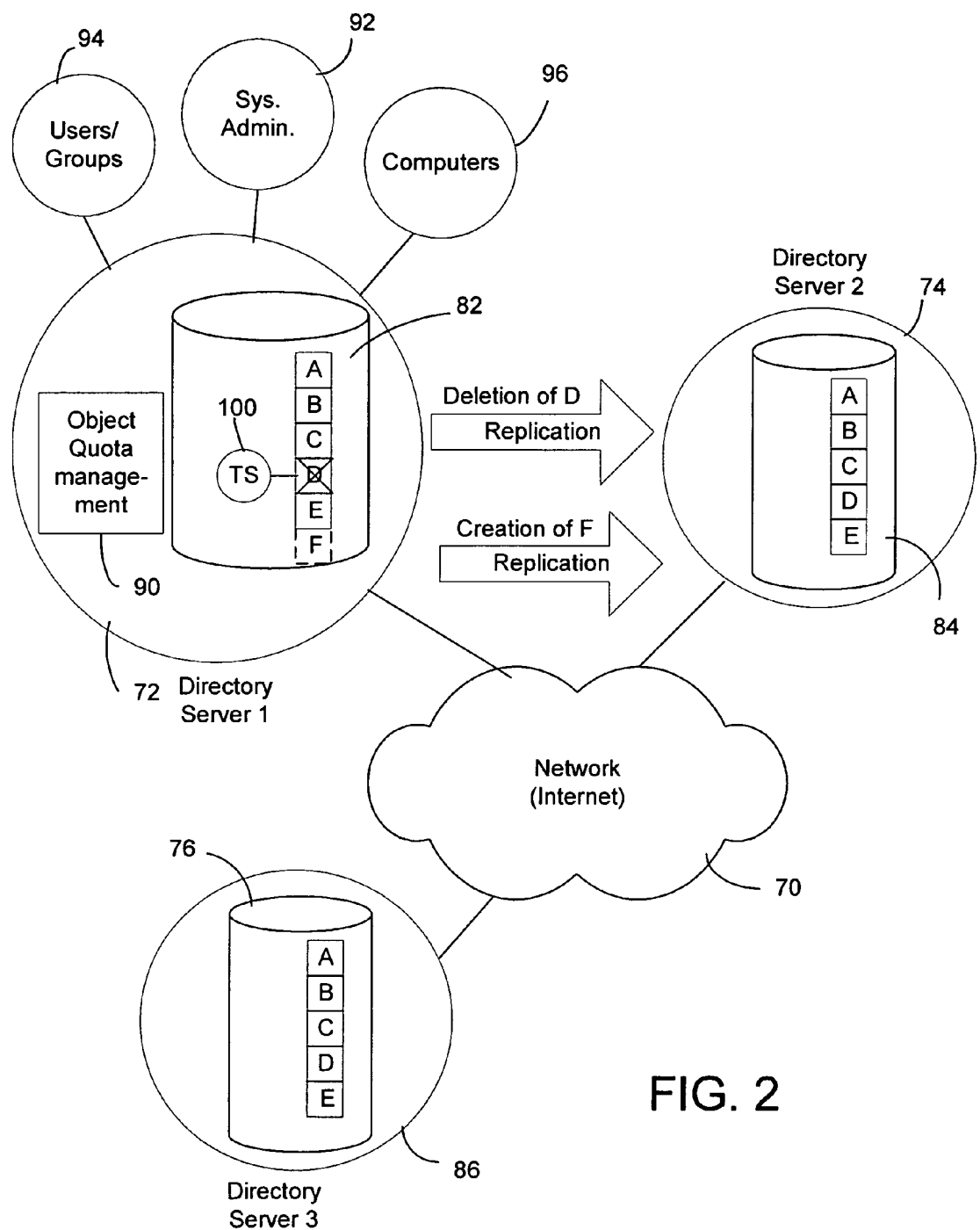
FIG. 2 is a schematic diagram showing an embodiment of a directory service system for a computer network that implements the object quota management of the invention.

Referring to FIG. 2, the present invention is directed to a system and method for controlling the creation of system objects in a directory service system to provide enhanced system security. As shown in FIG. 2, the directory service system includes a plurality of directory servers connected to each other via a computer network 70, such as the Internet. For simplicity of illustration, only three directory servers 72, 74, 76 are shown. The directory servers may be, for example, Active Directory domain controllers. They form a distributed database system in which directory service data in the form of objects are replicated among the directory servers. To that end, each directory server includes a local database 82, 84, 86. Each local database includes system objects representing users, computers, groups, etc., as well as various other objects representing other types of operational and administrative data. The system objects in the database of a directory server, especially the user, computer, and group objects, may be created by authorized entities such as system administrators 92 regular users 94, and computers 96, depending on the implementation of the directory service system.

As the directory service is a distributed database system, changes made to objects on one directory server will be replicated to other servers in the system. By way of example, if the directory server 72 creates a new object F as illustrated in FIG. 2, that creation is replicated to the other servers so that each of the other servers will have the object F in their respective local databases at a later time. Similarly, if the object D is deleted from the local database 82 of the directory server 72, that deletion is replicated to the other servers. For purposes of the replication process, when the object D is deleted, a "tombstone" object 100 is created to indicate that the object D has been deleted. The tombstone object will typically be removed only after sufficient time has passed to ensure that the deletion has been replicated to the other servers.

As mentioned earlier, if each entity capable of creating system objects is allowed to create as many objects as it wants, there is a security risk that one entity may launch a denial-of-service attack by creating a large number of objects to use up the system resources. In accordance with an aspect of the invention, to prevent such a risk, the directory service implements a quota system that may assign a quota to a given entity on the number of objects that entity is allowed to own. In this regard, the entity that creates an object is generally the "owner" of the object unless the ownership is transferred to another entity. As will be described in greater detail below, the directory server includes an object quota management function 90 for assigning quotas, tracking quota consumption, and enforcing the quotas.

As also mentioned earlier, even if an entity is assigned a quota, it may still be able to launch an attack by repeatedly creating and deleting objects many times. Each time an object is deleted, a corresponding tombstone is created. Even though a tombstone is typically significantly smaller than regular system objects, a large number of tombstones can still require a substantial amount of system resources to store and keeping track of them.

In accordance with a feature of the invention, tombstones for deleted objects are taken into account in the enforcement of object quotas assigned to the network entities. Specifically, tombstones for deleted objects of an entity are counted in determining whether the total number of objects owned by that entity will exceed the assigned quota. When that entity makes a request for a directory operation that will increase the total number of objects it owns, the total number of objects is compared with the quota to decide whether the required operation should be performed. Such operations include, for instance, adding a new object, undeleting a deleted object, or accepting a transfer of ownership of an object created by another entity, etc.

In accordance with a related feature of the invention, instead of counting each tombstone as a full object in the calculation of the total number of objects owned by the entity, each tombstone is counted as one fraction of an object. In other words, in counting the total number of objects to determine whether the quota is reached, a tombstone is given the weight of a fraction of a regular system object. The weighted total is then compared with the quota of that entity. This approach reflects that a tombstone is typically smaller than a regular system object. The use of such calculation in the operation of enforcing quotas will be described in greater detail below.

Figure 3:
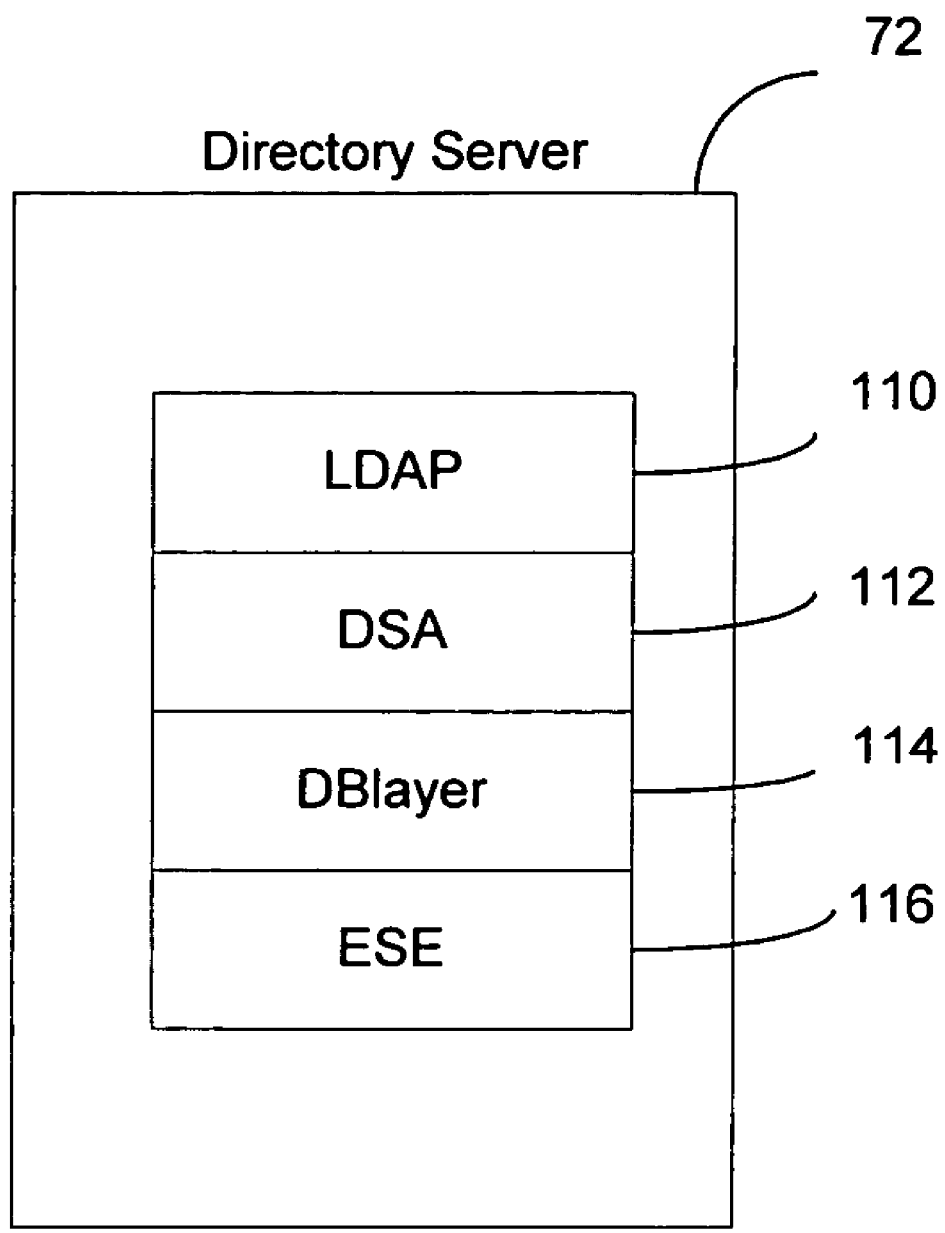
FIG. 3 is a schematic block diagram showing components of a computing device for implementing the object quota management in an embodiment of the invention.

In a preferred embodiment as shown in FIG. 3, each directory server (such as the server 72) has a Lightweight Directory Access Protocol (LDAP) layer (or head) 110, a Directory Service Agent (DSA) layer 112, a DBlayer 114, and an Extensible Storage Engine (ESE) database 116. The quota management operations as described below are mainly performed by the DSA layer 112 and the DBlayer 114.

Figure 4:
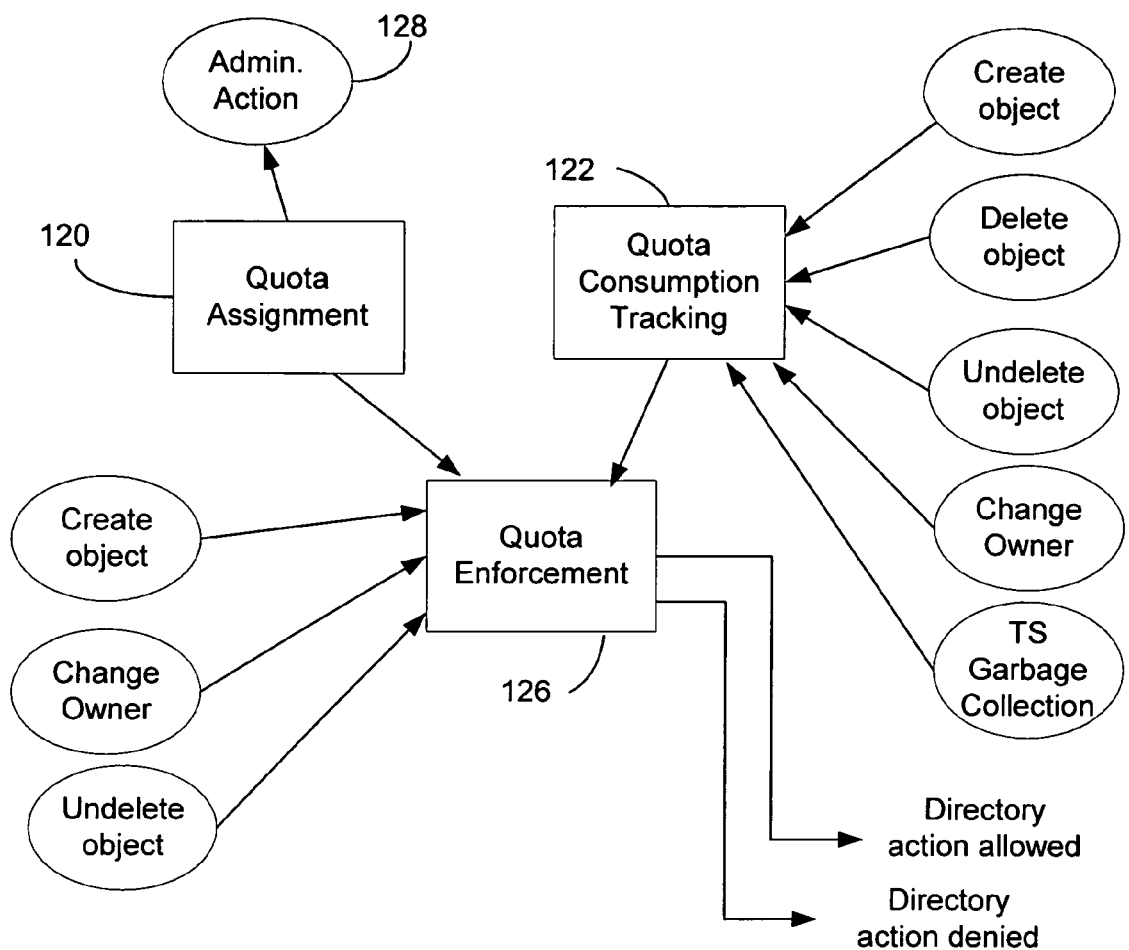
FIG. 4 is a schematic diagram showing architecture for managing quotas of directory service objects in accordance with the invention.

Turning now to FIG. 4, in a preferred embodiment, the quota management architecture includes three main functions: quota assignment 120, quota consumption tracking 122, and quota enforcement 126. The quota assignment is generated by an administrative action 128, which may set one or more default quotas and entity-specific quotas. As used herein in the context of quota management, the term "entity" is intended to include broadly individual users, computers, and groups.

Figure 5:
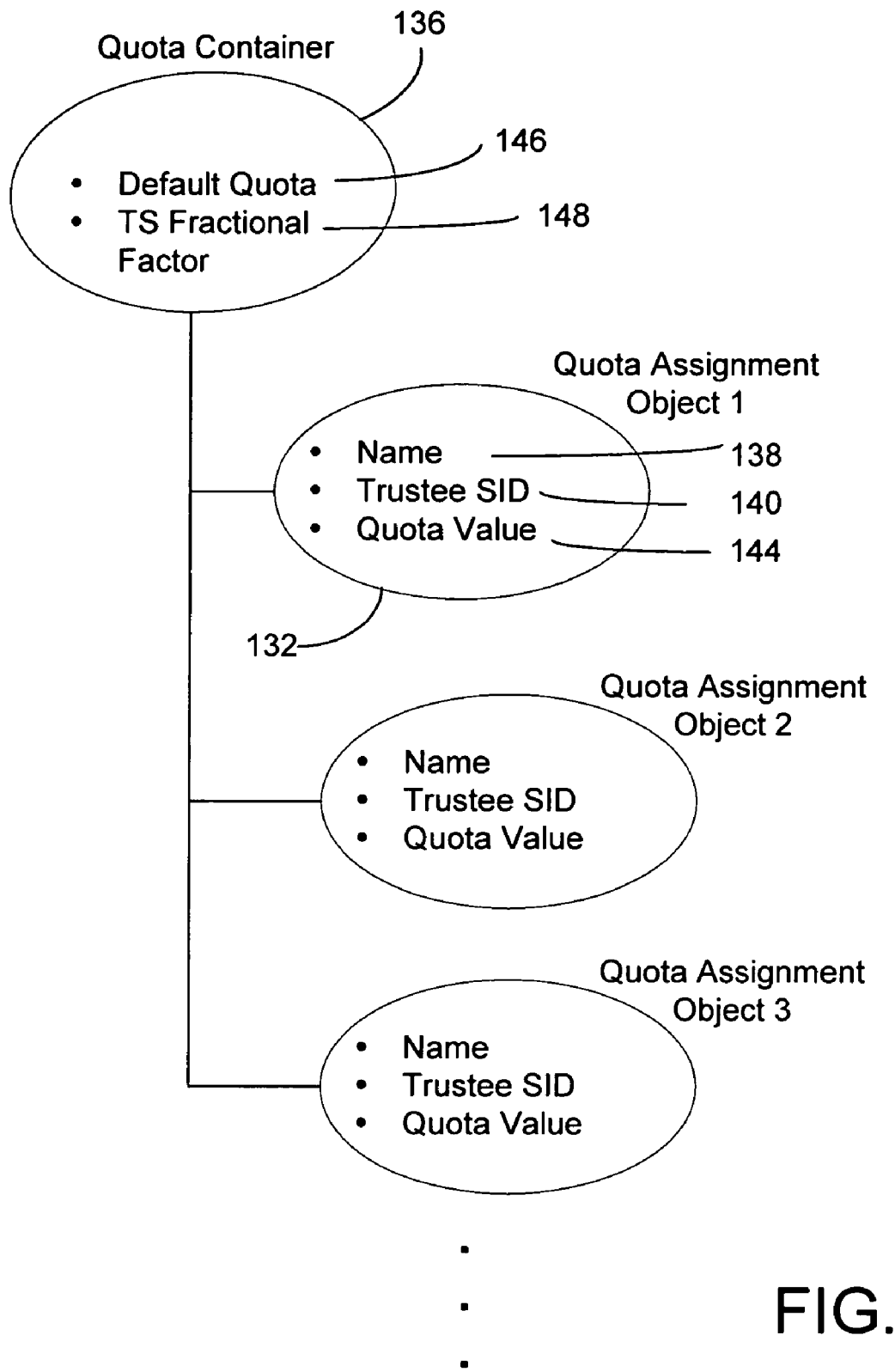
FIG. 5 is a schematic diagram showing objects used in an embodiment of the invention for quota assignments.

Referring now to FIG. 5, in a preferred embodiment the quota assignments are maintained as quota assignment objects 132 in a container object 136. Each quota assignment object 132 specifies the quota assigned to a particular entity, which may be an individual user, a computer, or a group. As illustrated in FIG. 5, each quota assignment object contains data members identifying a Common-Name 138, a Trustee attribute 140, and a quota value 144. The Common-Name 138 is a user-friendly name of the security principal whose quota is being specified. The Trustee attribute 140 is the security ID (SID) of that security principal. The quota value 144 is the number (e.g., 100) of directory objects the security principal is allowed to own. It is possible for one security principal to be covered by multiple quota assignments. For instance, there may be one assignment object for that security principal, and another assignment object for a group of which the security principal is a member. If a security principal is covered by more than one quota specification, then the effective quota for that security principal is the greatest of the quotas assigned by the multiple specifications.

The container object 136, on the other hand, defines a default quota 146 and a fractional tombstone factor 148 for counting tombstones. The default quota 146 may be applied to a user or computer that is capable of creating objects, if no quota assignment object exists that covers the user or computer. If a security principal is covered by at least one quota specification, then the default quota is not applicable to that security principal.

The fractional tombstone factor 148 is a factor by which a tombstone should be counted in determining the total number of objects currently owned by a security principal. Preferably it can be set by a system administrator to a suitable number in a range of 0 and 100%. For instance, the fractional tombstone factor 148 may be set to a value of 25. In one implementation, the fractional tombstone factor 148 is given as a percentage value (i.e., a value between 0 and 100). For example a value of 25 means that tombstones object counts only as 25%, or ¼, of a regular system object. By implication, an assigned quota value of 100 for a given user would allow that user to own a maximum of 100 normal directory service objects without any tombstones, or a maximum of 400 tombstone objects without any normal objects.

Not all entities of the directory service system have to be limited by specified or default object quotas. For instance, domain administrators and enterprise administrators may be always exempted from quota-imposed limits. In other words, they may have unlimited quotas.

Returning to FIG. 4, the function 122 of quota consumption tracking keeps track of and updates the quota consumption of each user. The directory operations that will require updates of the quota consumption tracking include, for example, the addition of a new object, deletion of an existing object, undeletion of a deleted object, change of ownership of an object, and garbage collection of tombstone objects.

Referring now to FIG. 6, in a preferred embodiment, a quota table 150 is used to keep track of the quota consumption of various security principals. As shown in FIG. 6, the quota table has a row for each security principal that owns any object in the directory service system. Each row includes the SID 156 of a corresponding security principal, a TombstoneCount value 158 for that security principal, and a TotalCount value 160. The TotalCount value is the straight (i.e., unweighted) sum of the number of normal objects and tombstone objects of that security principal. For example, if the security principal has 20 normal objects and 40 tombstone objects, the TotalCount value will be 60.

It should be noted that the TotalCount variable is defined in the way described above, rather than being a weighted sum, for the reason of simplifying the tracking of the numbers of normal and tombstone objects. With the operation of adding an object, the TotalCount is incremented by one. When the operation is the deletion of an object and the associated creation of a tombstone for that deleted object, the TombstoneCount is incremented by 1, while the Total-Count is unchanged. For the undeletion of an object, the TombstoneCount is decreased by one, while the TotalCount is again unchanged. In the case of change of owner of an object, the TotalCount for the old owner is reduced by one, and the TotalCount for the new owner is increased by one. For the operation of garbage collection of tombstone objects, with each tombstone object removed, the TotalCount and TombstoneCount of the security principal are both decreased by one.

Returning again to FIG. 4, the function of quota enforcement 126 is invoked when a user requests a directory operation that, if carried out, will increase the number owned by that user. Such operations include the addition of a new object, the undeletion of a deleted object, and the assumption of the ownership of an object. For instance, adding a new object will cause the quota tracking system to increase the weighted total number of objects of the user by one. If this will cause the object owner to exceed the allocated quota, the ADD operation will fail. Specifically, the quota consumption of a security principal after a directory operation is calculated as:

$$(T-S)+S*F/100,$$

where F is the fractional tombstone factor value (in percentage), T is the updated value of TotalCount of the security principal, and S is the updated value of the TombstoneCount. The question of whether the quota will be exceeded then becomes:

$$\text{if } (T-S)+S*F/100>Q?$$

where Q is the value of the assigned quota for the security principal. If the quota will be exceeded, the requested directory operation will fail. On the other hand, if the weighted total number after the operation is still within the quota, then it is allowed to proceed.

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. In a distributed directory service system that includes a plurality of directory servers connectable to one another through a network so that directory service objects are replicated through a distributed database among the plurality of directory servers, and wherein at least one of the directory servers is responsible for assigning quotas to network entities that are allowed to create directory service objects, tracking quota consumption of objects by such network entities, and enforcing quota limits as to consumption of objects by such network entities, a method by which the network entities are managed by the at least one responsible directory server with respect to the object quotas for such network entities, the method comprising steps for:

sending from a first network entity to the at least one responsible server a request for a directory operation, the first entity having an object quota assigned to it by the at least one responsible server, and owning a plurality of system objects and tombstones for deleted system objects, and the requested directory operation changing the number of objects owned by the first entity if performed;

performing at the first network entity the requested directory operation, but only if it is determined that the quota of the entity will not be exceeded, said determination being performed by, calculating a total number of objects as a sum of a number of said system objects of the first entity and a number of the tombstones owned by the first entity multiplied by a pre-selected, fractional tombstone factor, and then comparing the calculated total number with the quota assigned to the first entity to determine whether the quota assigned to the first entity will be exceeded if the requested directory operation is performed.

2. The method of claim 1 further comprising:

tracking the number of system objects owned by the first entity; and tracking the number of tombstones owned by the first entity.

3. The method of claim 1 further comprising:

maintaining a quota assignment object, the quota assignment object specifying a quota value for an entity of the directory service system permitted to create a system object.

4. In a distributed directory service system that includes a plurality of directory servers connectable to one another through a network so that directory service objects are replicated through a distributed database among the plurality of directory servers, and wherein at least one of the directory servers is responsible for assigning quotas to network entities that are allowed to create directory service objects, tracking quota consumption of objects by such network entities, and enforcing quota limits as to consumption of objects by such network entities, a computer program product comprised of a computer-readable medium having computer-executable instructions for implementing a method by which the network entities are managed by the at least one responsible directory server with respect to the object quotas for such network entities, and wherein the method is comprised of steps for:

receiving from the at the least one responsible server, at each of the plurality of entities, a quota on object creation;

sending to the at the least one responsible server a request from a first network entity for a directory operation;

performing at the first network entity the requested directory operation, but only if it is determined that the quota of the entity will not be exceeded, said determination being performed by, calculating a total number of objects as a sum of a number of said system objects of the first entity and a number of the tombstones owned by the first entity multiplied by a pre-selected, fractional tombstone factor, and then comparing the calculated total number with the quota assigned to the first entity to determine whether the quota assigned to the first entity will be exceeded if the requested directory operation is performed.

5. The computer-readable medium of claim 4 having further computer-executable instructions for:
tracking the number of system objects owned by the first entity; and tracking the number of tombstones owned by the first entity.

6. The computer-readable medium of claim 4 having further computer-executable instructions for:
maintaining a quota assignment object, the quota assignment object specifying a quota value for an entity of the directory service system permitted to create a system object.

* * * * *